(12) United States Patent
Furutani et al.

(10) Patent No.: US 8,046,789 B2
(45) Date of Patent: Oct. 25, 2011

(54) BROADCAST RECEIVING APPARATUS

(75) Inventors: Senichi Furutani, Daito (JP); Kosuke Kinoshita, Daito (JP); Eiichiro Mori, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 420 days.

(21) Appl. No.: 11/819,306

(22) Filed: Jun. 26, 2007

(65) Prior Publication Data

US 2008/0127243 A1    May 29, 2008

(30) Foreign Application Priority Data

Jun. 26, 2006  (JP) ................................ 2006-175274

(51) Int. Cl.
*H04N 7/16*    (2011.01)
(52) U.S. Cl. .......................................... 725/28; 725/27
(58) Field of Classification Search .................... 725/27, 725/28

See application file for complete search history.

(56) References Cited

U.S. PATENT DOCUMENTS

| | | | | |
|---|---|---|---|---|
| 6,100,916 | A * | 8/2000 | August et al. ................ | 725/28 |
| 6,684,240 | B1 | 1/2004 | Goddard | |
| 7,047,547 | B2 * | 5/2006 | Alten et al. ................. | 725/28 |
| 2003/0110488 | A1 * | 6/2003 | Lee ............................. | 725/30 |
| 2003/0115592 | A1 | 6/2003 | Johnson | |
| 2003/0163811 | A1 * | 8/2003 | Luehrs ......................... | 725/25 |
| 2006/0143648 | A1 * | 6/2006 | Shinokawa ................... | 725/25 |
| 2007/0056014 | A1 * | 3/2007 | Cheng ......................... | 725/134 |
| 2007/0245367 | A1 * | 10/2007 | Ogawa ......................... | 725/28 |

FOREIGN PATENT DOCUMENTS

| | | |
|---|---|---|
| JP | 2003-18528 A | 1/2003 |
| JP | 2003-517766 A | 5/2003 |
| JP | 2004-187328 A | 7/2004 |
| JP | 2005-115928 A | 4/2005 |
| JP | 2005-514818 A | 5/2005 |
| JP | 2005-354497 A | 12/2005 |
| JP | 2007-281686 A | 10/2007 |
| WO | WO 03/055215 A1 | 7/2003 |

OTHER PUBLICATIONS

Japanese Office Action (Notice of the Reason for Refusal) dated Apr. 22, 2008 with an English translation (Five (5) pages).

* cited by examiner

*Primary Examiner* — Pankaj Kumar
*Assistant Examiner* — Sahar Baig
(74) *Attorney, Agent, or Firm* — Crowell & Moring LLP

(57) ABSTRACT

Disclosed is a broadcast receiving apparatus which blocks a broadcast content in accordance with a plurality of broadcast content blocking standards, including a storing section to store rating data of the plurality of broadcast content blocking standards, each piece of the rating data being corresponding with one of first rating levels, a selecting section to select one of second rating levels, and a broadcast content blocking section to block one broadcast content in accordance with one of the second rating levels selected by the selecting section and in accordance with one of the first rating levels which is set at the storing section according to rating data extracted from data of the one broadcast content.

7 Claims, 6 Drawing Sheets

FIG.2

| BROADCAST CONTENT BLOCKING STANDARD | RATING DATA | RATING LEVEL |
|---|---|---|
| MPAA RATING | X | 1 |
| | NC-17 | 1 |
| | R | 2 |
| | PG-13 | 2 |
| | PG | 3 |
| | G | 4 |
| | NR | 5 |
| TV PARENTAL GUIDELINES | TV-MA | 1 |
| | TV-14 | 2 |
| | TV-PG | 3 |
| | TV-G | 4 |
| | TV-Y7 | 3 |
| | TV-Y | 4 |
| | NR | 5 |
| CANADIAN ENGLISH RATING | 18+ | 1 |
| | 14+ | 2 |
| | PG | 3 |
| | G | 4 |
| | C8+ | 3 |
| | C | 4 |
| | E | 5 |
| CANADIAN FRENCH RATING | 18ans+ | 1 |
| | 16ans+ | 2 |
| | 13ans+ | 2 |
| | 8ans+ | 3 |
| | G | 4 |
| | E | 5 |

FIG.3

| AUDIENCE LEVEL \ TIME ZONE | DAYTIME | NIGHTTIME |
|---|---|---|
| V-Chip Off | 0 | 0 |
| Adult | 1 | 2 |
| Youth | 3 | 4 |
| Child | 4 | 5 |

FIG.4

*V-Chip*

| AUDIENCE LEVEL \ TIME ZONE | DAYTIME | NIGHTTIME |
|---|---|---|
| Adult | 1 | 2 |
| Youth | 3 | 4 |
| Child | 4 | 5 |

( Select )  ( V-Chip Block )  ( Back )

BROADCAST RECEIVING APPARATUS

BACKGROUND OF THE INVENTION

1. Field of the Invention

The present invention relates to a broadcast receiving apparatus that blocks a broadcast content by using a plurality of broadcast content blocking standards.

2. Description of the Related Art

Conventionally, with respect to a broadcast receiving apparatus such as a television receiver and the like, various kinds of rating systems to block a broadcast content that may provide harmful effects to an audience have been known. In the rating system, rating data, which rates the broadcast content in accordance with details of the broadcast content, age of the audience or a combination thereof, is sent to the broadcast receiving apparatus by superimposing the rating data on broadcast content data. Accordingly, at the receiving side, the broadcast content is blocked in accordance with a broadcast content blocking level which is set beforehand, and the rating data which is received with the broadcast content data.

For example, according to a broadcast content blocking apparatus disclosed in Japanese Patent Application Publication (Laid open) No. 2004-187328, it is determined whether the rating data which is transmitted with the broadcast content is higher than the broadcast content blocking level or not. In a case where it is determined that the rating data is higher than the broadcast content blocking level, channel information of a channel that broadcasts a broadcast content having the rating data is deleted from a broadcast station selecting map. Therefore, the broadcast content can be blocked by just setting the broadcast content blocking level.

Further for example, a method and an apparatus for setting up rating limits with respect to a parental control system, which are disclosed in Japanese Patent Application Publication (Laid open) No. 2005-514818, simply a process of setting up rating limits by providing a user with concrete examples of contents that he or she may want to allow or block, thus eliminating errors caused by the abstractness of the ratings.

Japanese Patent Application Publication (Laid open) No. 2005-354497 discloses an access controlling apparatus that allows access control by taking meaning details of a broadcast content into consideration, for each scene of the broadcast content. Japanese Patent Application Publication (Laid open) No. 2005-115928 discloses a technique of parental control which allows readily setting of access maximum level by using a controller such as a slider.

However, with respect to the rating systems mentioned above, a plurality of broadcast content blocking standards that are different from each other are used in accordance with a country where the content is broadcasted, a broadcast station, type of the broadcast content, and the like. Therefore, a broadcast receiving apparatus which can block a broadcast content in accordance with a plurality of broadcast content blocking standards requires setting of broadcast content blocking level for each of the broadcast content blocking standards. This leads to a problem that burden of a user becomes heavy.

A method to set a broadcast content blocking level for a conventional broadcast receiving apparatus which can block broadcast content in accordance with a plurality of broadcast content blocking standards will be described in detail with reference to FIGS. 7A through 7C. FIGS. 7A through 7C are examples of setting screens to set the broadcast content blocking level, in accordance with the plurality of broadcast content blocking standards, for the conventional broadcast receiving apparatus. FIG. 7A is a setting screen of a broadcast content blocking level with respect to Motion Picture Association of America (MPAA) Rating, FIG. 7B is a setting screen of a broadcast content blocking level with respect to TV Parental Guidelines, and FIG. 7C is a setting screen of a broadcast content blocking level with respect to Canadian English Language Rating and a broadcast content blocking level with respect to Canadian French Language Rating. As shown in FIGS. 7A through 7C, in order to block broadcast content in accordance with a plurality of broadcast content blocking standards, setting of the broadcast content blocking level had to be made individually for each of the broadcast content blocking standards.

SUMMARY OF THE INVENTION

The present invention has been made in view of the above circumstances. An object of the present invention is to reduce the burden of a user relating to the setting of the broadcast content blocking level of a broadcast receiving apparatus that blocks a broadcast content in accordance with a plurality of broadcast content blocking standards, the setting being made for a plurality of broadcast content blocking standards.

According to a first aspect of the present invention, there is provided a broadcast receiving apparatus which blocks a broadcast content in accordance with a plurality of broadcast content blocking standards, comprising:

a storing section provided with a first setting table and a second setting table, the first setting table storing rating data of the plurality of broadcast content blocking standards, each piece of the rating data being corresponding with one of first rating levels, and the second setting table storing a plurality of audience levels, each of the plurality of audience levels being corresponding with one of second rating levels;

a selecting section to select one of the second rating levels, the selecting section being provided with a display control section to make a display section display a selecting screen and an input section to select one of the audience levels in the selecting screen displayed in the display section;

a broadcast content blocking section to block one broadcast content, in accordance with one of the second rating levels which is set at the second setting table according to the one of the audience levels selected by the input section and in accordance with one of the first rating levels which is set at the first setting table according to rating data extracted from data of the one broadcast content; and a setting section to set the plurality of audience levels, each of the audience levels being corresponding with one of the second rating levels in accordance with time zones and to register the plurality of audience levels and the second rating levels in the second setting table, wherein the display control section makes the display section display a level meter to select one of the audience levels, and the input section selects the one of the audience levels by changing a selected level of the level meter.

According to a second aspect of the present invention, there is provided a broadcast receiving apparatus which blocks a broadcast content in accordance with a plurality of broadcast content blocking standards, comprising:

a storing section to store rating data of the plurality of broadcast content blocking standards, each piece of the rating data being corresponding with one of first rating levels;

a selecting section to select one of second rating levels; and a broadcast content blocking section to block one broadcast content in accordance with one of the second rating levels selected by the selecting section and in accordance with one of the first rating levels which is set at the storing section according to rating data extracted from data of the one broadcast content.

BRIEF DESCRIPTION OF THE DRAWINGS

The above and further objects, features and advantages of the present invention will become more apparent from the following detailed description taken in conjunction with the accompanying drawings, wherein:

FIG. 2 is a view showing an example of a first setting table;

FIG. 3 is a view showing an example of a second setting table;

FIG. 4 is a view showing an example of a setting screen of the second setting table which is displayed on a display unit, in a case where a setting program is executed by a CPU;

DESCRIPTION OF THE PREFERRED EMBODIMENTS

Figure 1:
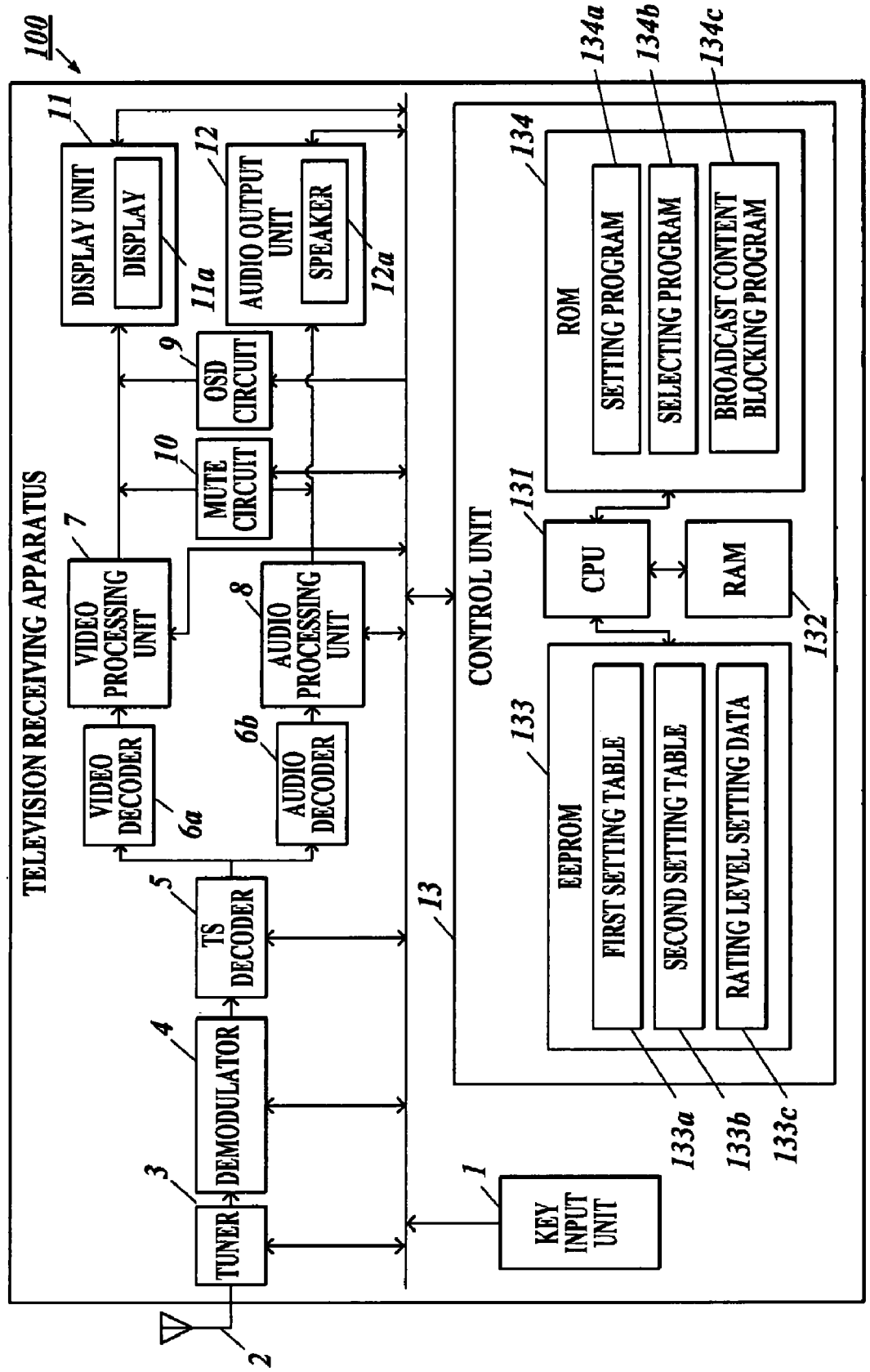
FIG. 1 is a block diagram showing an example of main structure of a television receiving apparatus according to the present embodiment.

Hereinafter, an embodiment of the present invention will be described with reference to drawings. The scope of the invention shall not be limited to the examples shown in the drawings.

In the present embodiment, description is given for a case where the broadcast receiving apparatus is a television receiving apparatus that blocks a television broadcast content.

FIG. 1 is a block diagram showing an example of main structure of a television receiving apparatus 100 according to the present embodiment.

The television receiving apparatus 100 of the present embodiment is capable of blocking a broadcast content in accordance with a plurality of broadcast content blocking standards. Here, for example, a broadcast content is blocked in accordance with four broadcast content blocking standards of Motion Picture Association of America (MPAA) Rating, TV Parental Guidelines, Canadian English Language Rating and Canadian French Language Rating.

Broadcast content blocking in accordance with these broadcast content blocking standards will be described in detail.

At a transmission side of the broadcast content, rating data is superimposed on each piece of broadcast content data, and the broadcast content data is transmitted. The rating data is developed individually for each of the broadcast content blocking standards of MPAA Rating, TV Parental Guidelines, Canadian English Language Rating and Canadian French Language Rating.

For example, the broadcast content blocking standard of MPAA, which is one of the plurality of broadcast content blocking standards, adds rating data of X (viewing by under 17 is blocked) which is a former restriction of NC-17, NC-17 (viewing by under 17 is blocked), R (viewing with parent is required for under 17), PG-13 (guide by a parent is recommended for under 13), PG (guide by a parent is recommended), G (for general) and NR (Not Rated; no restriction) to the broadcast content data.

The broadcast content blocking standard of TV Parental Guidelines adds rating data of TV-MA (broadcast content for adult), TV-14 (strong warning to parents, broadcast content which is undesirable for children under 14), TV-PG (broadcast content for which guide by a parent is recommended), TV-G (broadcast content for general), TV-Y7 (broadcast content for children of 7 and older), TV-Y (broadcast content for all children), and NR (Not Rated; no restriction) to the broadcast content data.

The broadcast content blocking standard of Canadian English Language Rating adds rating data of 18+ (broadcast content for 18 and older), 14+ (broadcast content for 14 and older), PG (broadcast content for which guide by a parent is recommended), G (broadcast content for general), C8+ (broadcast content for children of 8 and older), C (broadcast content for children under 8) and E (Exempt) to the broadcast content data.

The broadcast content blocking standard of Canadian French Language Rating adds rating data of 18ans+ (broadcast content for 18 and older), 16ans+ (broadcast content for 16 and older), 13ans+ (broadcast content for 13 and older), 8ans+ (broadcast content for children of 8 and older), G (broadcast content for general) and E (Exempt) to the broadcast content data.

The data receiving side is provided with setting data of broadcast content blocking level for each of the broadcast content blocking standards, that is, a first rating level that indicates which broadcast content should be blocked in accordance with the rating data which is added to the broadcast content. When the data receiving side receives the rating data that is superimposed on the broadcast content, a broadcast content with a specified rating data is blocked in accordance with a comparison result of the received rating data and the setting data.

The television receiving apparatus 100 according to the present embodiment stores a first setting table 133a in which one of first rating levels is assigned to each piece of the rating data, and a second setting table 133b in which one of second rating levels is assigned to each of the audience levels. In accordance with the audience level selected by a user, the television receiving apparatus 100 refers to the first setting table 133a and to the second setting table 133b, and determines whether blocking of the broadcast content is required or not. With this structure, broadcast content is blocked in accordance with a plurality of broadcast content blocking standards by only selecting one audience level, without setting the broadcast content blocking level individually for each of the broadcast content blocking standards.

Next, main structure of the television receiving apparatus 100 according to the present embodiment will be described with reference to FIG. 1.

The television receiving apparatus 100 is provided with a key input unit 1 that serves as an input section to input various kinds of instructions by a remote operation of a user, an antenna 2 that receives a broadcast signal, a tuner 3 that tunes in a broadcast signal of a predetermined channel which is transmitted from the broadcast signal and is received by the antenna 2, a demodulator 4 that demodulates the broadcast signal tuned in by the tuner 3, a TS decoder 5 that separates the broadcast signal demodulated by the demodulator 4, a video decoder 6a and an audio decoder 6b that decode the broadcast signal separated by the TS decoder 5, a video processing unit 7 that conducts a predetermined processing to a video signal decoded by the video decoder 6a, an audio processing unit 8 that conducts a predetermined processing to an audio signal decoded by the audio decoder 6b, an OSD circuit 9 that superimposes OSD data to the video signal processed by the video processing unit 7, a mute circuit 10 that serves as a broadcast content blocking section which mutes video/audio signal output from the video processing unit 7 and the audio processing unit 8, a display unit 11 that serves as a display section to output the video signal processed by the video processing unit 7, an audio output unit 12 that outputs the audio signal processed by the audio processing unit 8 and a control unit 13 to control the entire television receiving apparatus 100 in an integrated manner. Each unit is connected through a bus 14.

The key input unit 1 is a remote controller (hereinafter referred to as remote) for example, and is provided with a plurality of keys. In a case where a user depresses a key of the key input unit 1, an input operation signal that corresponds to the key operation is output to the control unit 13.

The antenna 2 is arranged outdoors so as to be in a predetermined direction, and receives a television broadcast signal (RF signal) of radio frequency (RF), which is transmitted from a television broadcast station or the like not shown.

The tuner 3 is structured so as to include a radio frequency amplification circuit, and a frequency converting circuit including a local oscillation circuit and a blend circuit, for example, that are not shown in figures. The tuner 3 amplifies the television broadcast signal, which is input from the antenna 2 or the like, by the radio frequency amplification circuit and blends it with a local oscillation signal, which is output from the local oscillation circuit, by the blend circuit. Further, the tuner 3 receives an intermediate frequency signal (IF signal) of a particular frequency band in accordance with a control output from the control unit 13 in order to select a channel of a particular frequency, conducts a predetermined processing to the intermediate frequency signal, and outputs it to the demodulator 4.

The demodulator 4, for example, executes processing such as digital demodulation and correction of errors to the intermediate frequency signal which is output from the tuner, generates a transport stream (TS), and outputs it to the TS decoder 5, in accordance with the instruction from the control unit 13.

The TS decoder 5 separates the transport stream which is input from the demodulator 4, into information data such as a video stream of Moving Picture Experts Group 2 (MPEG2) standard, an audio stream, Program Specific Information/Service Information (PSO/SI), and the like. The TS decoder 5 also outputs the video stream to the video decoder 6a, and the audio stream to the audio decoder 6b. Further, the TS decoder 5 supplies information data, such as the PSI/SI and the like, to the control unit 13.

The information data is structured with a Program Map Table (PMT) which stores a packet identifier and the like, an Event Information Table (EIT) which stores service information and the like, and the like for example. Here, the rating data is included in the information data. The control unit 13 extracts the rating data included in the information data, and refers to the rating data when determining whether to block a broadcast content or not.

The video decoder 6a decodes the video stream which is input from the TS decoder 5, conducts reverse DCT, movement compensation control and the like, generates video data and outputs the video data to the video processing unit 7. The audio decoder 6b decodes the audio stream which is input from the TS decoder 5, generates audio data and outputs the audio data to the audio processing unit 8.

The video processing unit 7 conducts various kinds of processing such as D/A conversion and the like to the video data which is input from the video decoder 6a, and generates a video signal. The audio processing unit 8 conducts various kinds of processing such as D/A conversion and the like to the audio data which is input from the audio decoder 6b, and generates an audio signal. The generated video signal is output to the display unit 11, and the generated audio signal is output to the audio output unit 12.

The OSD circuit 9 conducts processing so as to synthesize OSD data (not shown) which is stored in the ROM 134, into a video signal which is output from the video processing unit 7, in accordance with an instruction which is output from the control unit 13.

The mute circuit 10 conducts a predetermined mute processing to the video signal which is output from the video processing unit 7 and to the audio signal which is output from the audio processing unit 8, in accordance with a control signal from the CPU 131 when executing a broadcast content blocking program 134c described later. Accordingly, a broadcast content is blocked.

The display unit 11 is provided with a display 11a such as a Liquid Crystal Display (LCD), Plasma Display Panel (PDP) and the like, and displays video that corresponds to the video signal which is input from the video processing unit 7, on the display 11a.

The audio output unit 12 is provided with a speaker 12a and the like for example, and outputs audio that corresponds to the audio signal which is input from the audio processing unit 8 from the speaker 12a.

The control unit 13 is structured provided with a Central Processing Unit (CPU) 131, a Random Access Memory (RAM) 132, an Electronically Erasable and Programmable Read Only Memory (EEPROM) 133 as a storing section, a Read Only Memory (ROM) 134 and the like.

The CPU 131 controls the entire operation of the television receiving apparatus 100 in an integrated manner, by executing various kinds of programs stored in the ROM 134 and by outputting output signal relating to execution of the program to each unit, in accordance with input signal which is input from each unit of the television receiving apparatus 100.

The RAM 132 is used as a work area of the CPU 131, and temporally stores processing results which is generated when the CPU 131 executes the various kinds of programs, data which is input, and the like.

The EEPROM 133 is a re-writable semiconductor memory for example, and stores the first setting table 133a, the second setting table 133b and the rating level setting data 133c.

Here, although not shown in the drawings, the EEPROM 133 stores initial setting value data of these data in another region.

The first setting table 133a is used in association with the second setting table 133b for example, and stores rating data of the plurality of broadcast content blocking standards, each piece of the rating data being corresponding with one of first rating levels. Assigning one of the first rating levels to each piece of the rating data of the plurality of broadcast content blocking standards at the first setting table 133a allows the each piece of rating data, that are different from each other with respect each of the plurality of broadcast content blocking standards, to be integrated as one type of rating data.

Here, this first rating levels are numeric value data such as [1] through [5] for example, and the highest first rating level (restriction is strict) is assigned with [5], and the lowest first rating level (restriction is loose) is assigned with [1].

FIG. 2 is a view showing an example of the first setting table 133a. As shown in FIG. 2, the first setting table 133a assigns first rating levels of [1] through [5] for each piece of the rating data with respect to each of the plurality of broadcast content blocking standards. Here, the plurality of broadcast content blocking standards are the MPAA Rating, the TV Parental Guidelines, the Canadian English Language Rating, and the Canadian French Language Rating. For example, with respect to the rating data of MPAA, X and NC-17 are assigned with [1], R and PG-13 are assigned with [2], PG is assigned with [3], G is assigned with [4] and NR is assigned with [5]. With respect to the rating data of TV Parental Guidelines, TV-MA is assigned with [1], TV-14 is assigned with [2], TV-PG and TV-Y7 are assigned with [3], TV-G and TV-Y are assigned with [4] and NR is assigned with [5]. Further, although description will be omitted, each piece of rating data of the Canadian English Language Rating and the Canadian French Language Rating is assigned with first rating levels.

The second setting table 133b is used in association with the first setting table 133a for example, and stores a plurality of audience levels, each of the plurality of audience levels being corresponding with one of second rating levels. Further, the second setting table 133b assigns the one of the second rating levels to each of the audience levels depending on time zones.

FIG. 3 is a view showing an example of the second setting table 133b. As shown in FIG. 3, the second setting table 133b assigns second rating levels of [0] through [5] to each of V-Chip off and the three audience levels, depending on time zones of daytime and nighttime. Here, the three audience levels are Adult, Youth and Child.

With respect to the execution of the setting program 134 described later, in a case where an operation to assign one of second rating levels to each of the audience levels is conducted by the user, the second setting table 133b updates the data in accordance with the setting operation and registers the second rating levels which is set.

The rating level setting data 133c is data that store an audience level which is selected by the user, the audience level being selected in a rating level setting screen displayed on the display unit 11, when a selecting program 134b described later is executed. For example, one audience level which is selected among Adult, Youth and Child, or "V-Chip off" is stored.

The ROM 134 stores various kinds of initial setting value and the like that relate to data processing program, in addition to various kinds of data processing programs executed by the CPU 131. For example, the setting program 134a, the selecting program 134b, the broadcast content blocking program 134c and the like are stored in the ROM 304.

The setting program 134a is a program to make the CPU 131 realize a function to assign each of the audience levels with one of second rating levels by predetermined time zones, and to register them in the second setting table 133b.

Specifically, in a case where a key is operated to request alteration of setting of the second setting table 133b by a user through the key input unit 1, the CPU 131 reads out the second setting table 133b, which indicates a relationship between the audience level and the second rating level, from the EEPROM 133, generates a setting screen of the second setting table in accordance with the second setting table 133b which is read out, and displays it in the display 11a of the display unit 11.

FIG. 4 is a view showing an example of the setting screen of the second setting table which is displayed on the display unit 11, when the setting program 134a is executed. As shown in FIG. 4, in the setting screen of the second setting table, second rating levels of [1] through [5] can be assigned to each audience level of Adult, Youth and Child, by the time zone. Here, the audience level is read from the EEPROM 133. In the setting screen of the second setting table, the CPU 131 updates the second setting table 133b in the EEPROM 133, in accordance with the data registered through the operation of the key input unit 1 by the user. Here, the [0] assigned to the item of V-Chip off in the second setting table of the EEPROM 133 is a fixed value, and thus the second rating level cannot be assigned to the V-Chip off in the second setting table.

The CPU 131 serves as a setting section by executing the setting program 134a to set broadcast content blocking information.

The selecting program 134b is a program to realize a function to select the second rating level, by making the CPU 131 display a rating level selecting screen to select an audience level (selecting screen), to select the audience level, on the display unit 11, and then selecting one audience level in accordance with an operation of the key input unit 1 in the rating level selecting screen.

In particular, in a case where the key is operated to request selecting of one of second rating levels by the user through the key input unit 1, the CPU 131 displays the rating level selecting screen on the display 11a of the display unit 11.

Figure 5A:
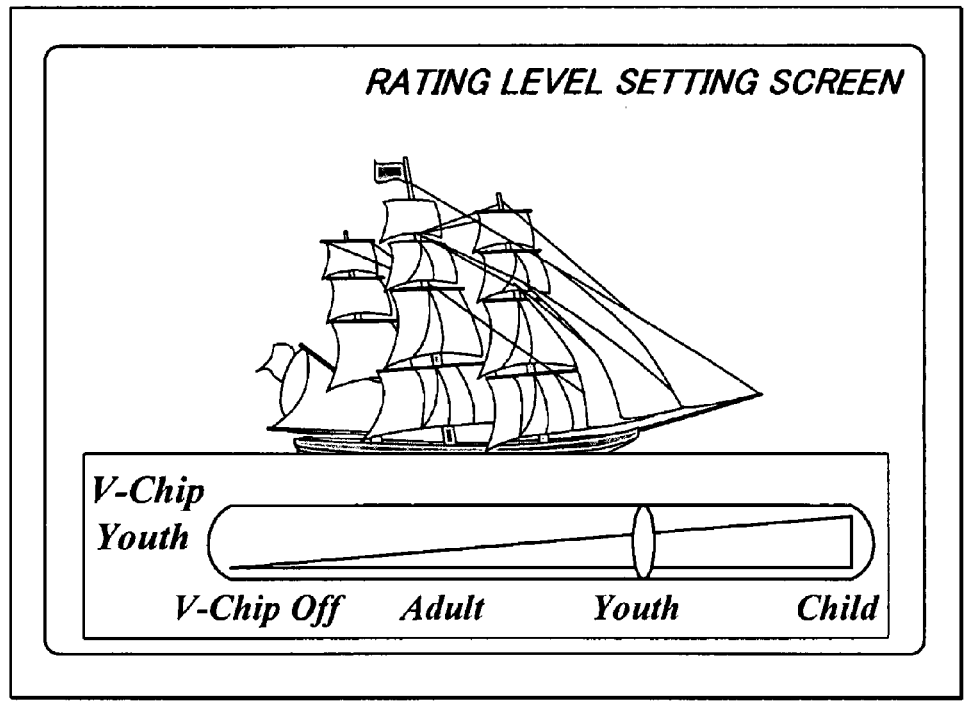
FIG. 5A is a view showing an example of a rating level selecting screen which is displayed in a case where a selecting program is executed by the CPU, the rating level selecting screen being a screen to select an audience level by using a level meter.
Figure 5B:
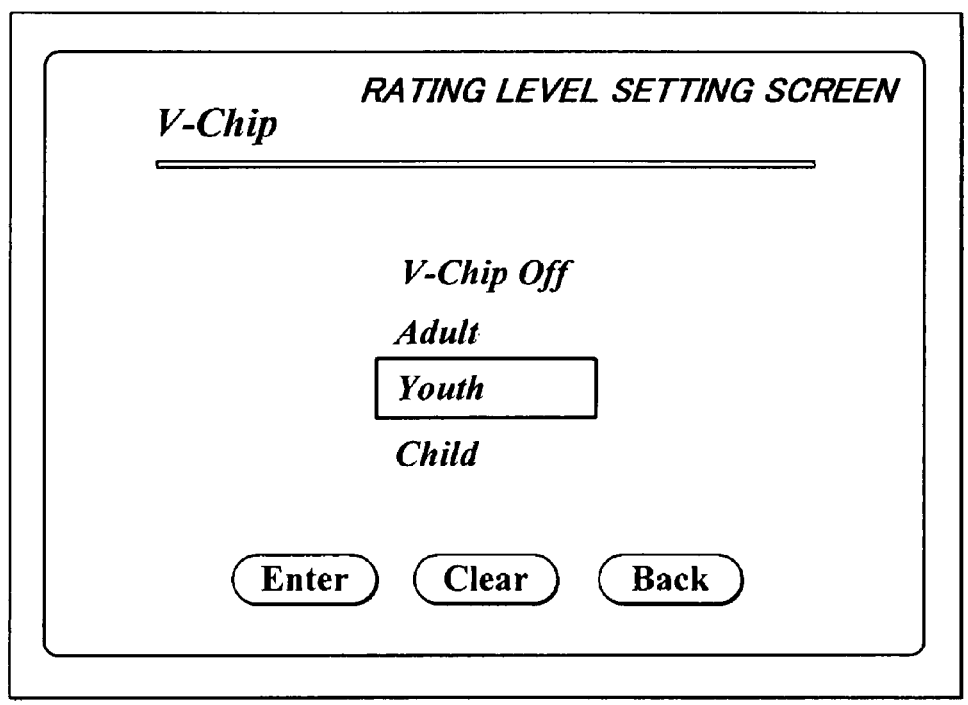
FIG. 5B a view showing an example of a rating level selecting screen which is displayed in a case where a selecting program is executed by the CPU, the rating level selecting screen being a screen to select an audience level directly.

FIGS. 5A and 5B are views showing an example of the rating level selecting screen that is displayed on the display unit 11 when the selecting program 134b is executed. As shown in FIG. 5A, a level meter is displayed in the rating level selecting screen, and one audience level is selected from Adult, Youth and Child, by moving a level location of the level meter through an operation of the key input unit 1. In the rating level selecting screen, V-Chip off can also be selected. As the level location of the level meter is moved from left to right, items of V-Chip off, Adult, Youth, and Child are selected in this order. Here, the rating level selecting screen is not limited to the one that displays the level meter as in FIG. 5A, and it may be a rating level selecting screen in which the audience level is selected directly, as shown in FIG. 5B for example.

The CPU 131 stores the audience level, which is selected through the operation of the key input unit 1 at the rating level selecting screen by the user, in the rating level setting data 133c of the EEPROM 133. Then, in the broadcast content blocking program 134c described later, it is determined whether broadcast content blocking is necessary or not, in accordance with the second rating level, the second rating level being corresponding with the audience level, which is stored in the rating level setting data 133c, in the second setting table 133b.

The CPU 131 serves as a display control section and a selecting section by executing the selecting program 134b.

The broadcast content blocking program 134c is a program to make the CPU 131 realize a function to block one broadcast content, in accordance with the second rating level which is set at the second setting table 133b according to the audience level which is selected by execution of the selecting program 134b, and in accordance with the first rating level which is set at the first setting table 133a according to the rating data extracted from the one broadcast content.

In particular, in a case where the broadcast content data is received, the CPU 131 performs the afore-mentioned processing by the tuner 3, the demodulator 4 and the like, separates information data by the TS decoder 5, and extracts rating data from the separated information data. Subsequently, the CPU 131 refers to the first setting table 133a (refer to FIG. 2), and reads out the first rating level which is set in accordance with the rating data extracted from the broadcast content data. Further, the CPU 131 reads out the audience level which is stored in the rating level setting data 133c of the EEPROM 133, the audience level being selected by the user by execution of the selecting program 134b. Subsequently, the CPU 131 refers to the second setting table 133b (refer to FIG. 3) and reads out the second rating level which is assigned to the audience level which is stored in the rating level setting data 133c. Here, the CPU 131 obtains current time data which is superimposed on the broadcast content data or current time data which is timed by a timing unit not shown, determines whether current time is in a daytime time zone (for example, 5:00 A.M. to 5:00 P.M.) or is in a nighttime time zone (for example, 5:00 P.M. to 5:00 P.M.) in accordance with the obtained current time data, and reads out the second rating level of the current time zone, the second rating level being corresponding with the audience level, from the second setting table 133b.

Subsequently, the CPU 131 compares the first rating level which is set at the first setting table 133a according to the rating data which is extracted from the broadcast content data (hereinafter referred to as "first rating level set in connection with the rating data which is extracted from the broadcast content data"), and the second rating level which is set at the second setting table 133b in connection with the audience level which is selected by the user (hereinafter referred to as "second rating level selected by the user"). In a case where it is determined that the first rating level set in connection with the rating data which is extracted from the broadcast content data is lower than the second rating level selected by the user, the CPU 131 outputs a control signal to the mute circuit 10 and conducts a predetermined mute processing, so as to block the broadcast content. In a case where it is determined that the first rating level set in connection with the rating data which is extracted from the broadcast content data is higher than the second rating level selected by the user, the CPU 131 outputs the video/audio in correspondence with the broadcast content data without conducting the mute processing.

The CPU 131 serves as the mute circuit 10 and a broadcast content blocking section by executing the broadcast content blocking program 134c.

A more detailed description will be given with respect to the broadcast content blocking program 134c. Here, the description will be given in accordance with the second setting table 133b shown as an example in FIG. 3.

For example, with respect to the rating level selecting screen in accordance with execution of the selecting program 134b, in a case where V-Chip off is selected by the user and the second rating level which is set at the second setting table 133b in connection with V-Chip off is [0], the first rating level set in connection with the rating data which is extracted from the broadcast content data inevitably becomes higher than the second rating level selected by the user. Therefore, the broadcast content is not blocked, and thus all of the broadcast content can be received.

Further, with respect to the rating level selecting screen, in a case where Adult is selected by the user and the second rating level which is set at the second setting table 133b in connection with Adult is [1] (or [2] in a case where it is nighttime time zone), broadcast content is blocked when rating data cannot be extracted from the broadcast content data (or when the first rating level set in connection with the extracted rating data is [1] in nighttime time zone). Also in this case, viewing is allowed when the first rating level set in connection with the extracted rating data is [1] or higher (or when it is [2] or higher in nighttime time zone).

With respect to the rating level selecting screen, in a case where Youth is selected by the user and the second rating level which is set at the second setting table 133b in connection with Youth is [3] (or [4] in a case where it is nighttime time zone), broadcast content is blocked when first rating level set in connection with the extracted rating data is [2] or lower (or when it is [3] or lower in nighttime time zone). Also in this case, viewing is allowed when the first rating level set in connection with the extracted rating data is [3] or higher (or when it is [4] or higher in nighttime time zone).

With respect to the rating level selecting screen, in a case where Child is selected by the user and the second rating level which is set at the second setting table 133b in connection with Child is [4] (or [5] in a case where it is nighttime time zone), broadcast content is blocked when first rating level set in connection with the extracted rating data is [3] or lower (or when it is [4] or lower in nighttime time zone). Also in this case, viewing is allowed when the first rating level set in connection with the extracted rating data is [4] or higher (or when it is [5] or higher in nighttime time zone).

That is for example, with respect to the rating level selecting screen, in a case where the audience level selected by the user is Youth and the rating data which is extracted from a broadcast content data in daytime time zone is [R] of the MPAA Rating, the second rating level which is set in the second setting table 133b in connection with Youth is [3], and the first rating level which is set at the first setting table 133a in connection with [R] is [2]. Therefore, the first rating level set in connection with the rating data which is extracted from the broadcast content data ([2]) is lower than the second rating level selected by the user ([3]). Accordingly, the broadcast content is blocked.

Figure 6:
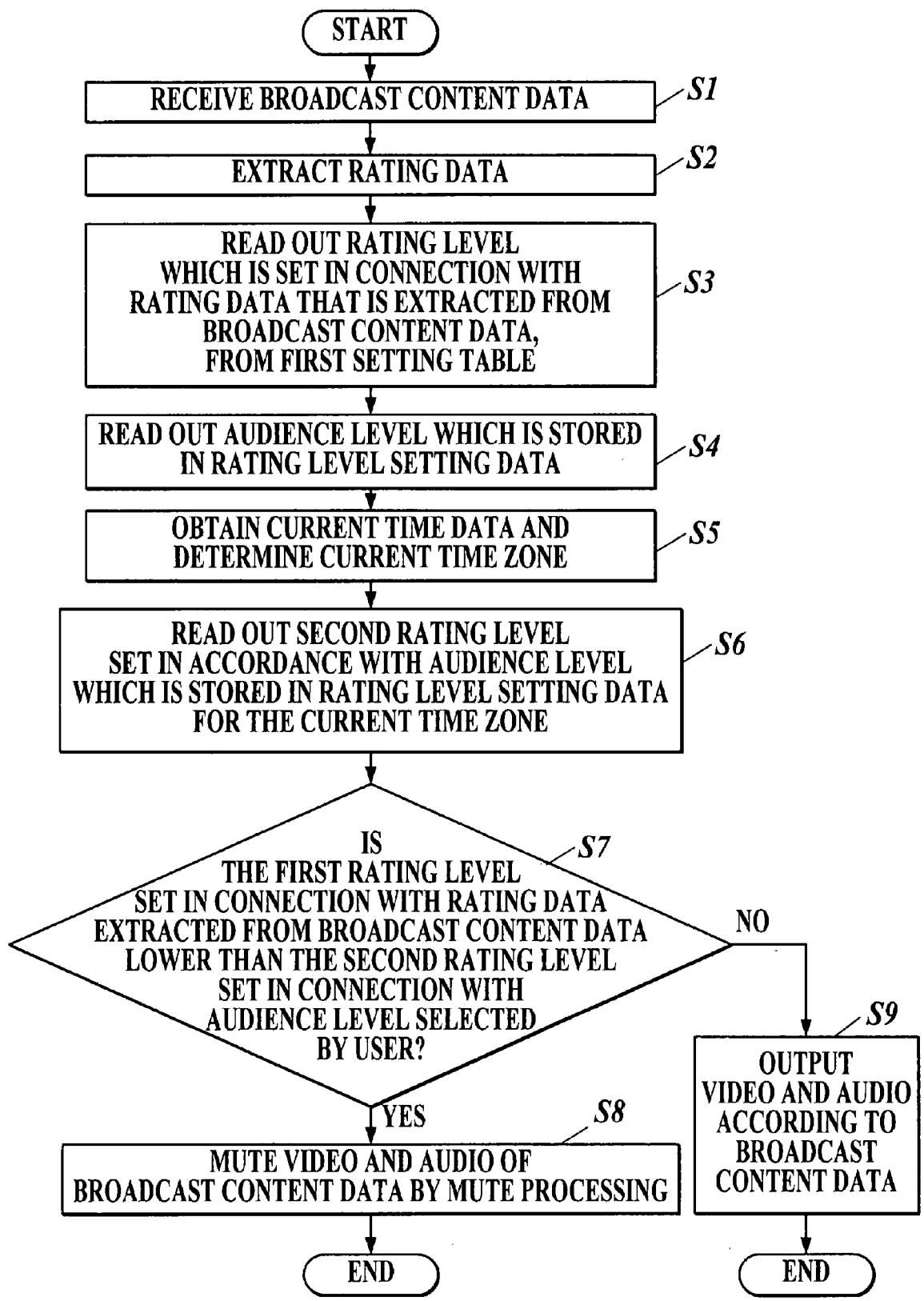
FIG. 6 is a flowchart showing a broadcast content blocking processing performed by the CPU.
Figure 7A:
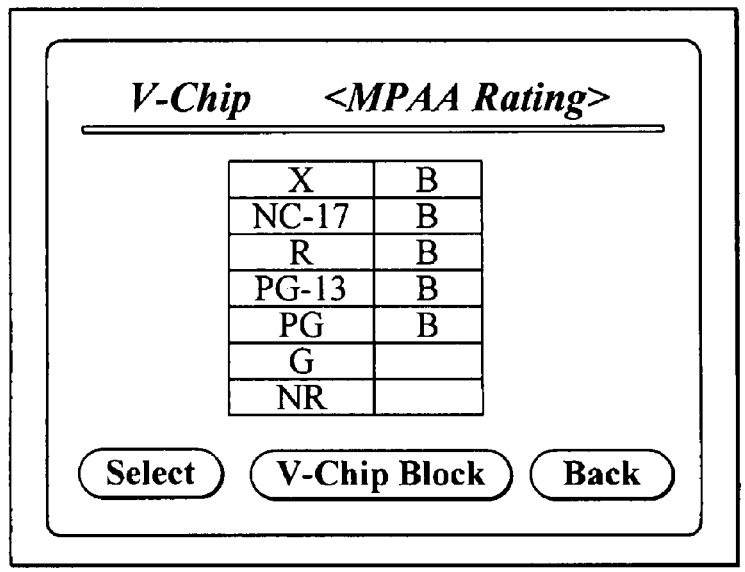
FIG. 7A is a view showing an example of a setting screen to set a broadcast content blocking level for the conventional broadcast receiving apparatus in accordance with a plurality of broadcast content blocking standards, in a case where the setting screen of the broadcast content blocking level is set with respect to Motion Picture Association of America (MPAA) Rating.
Figure 7B:
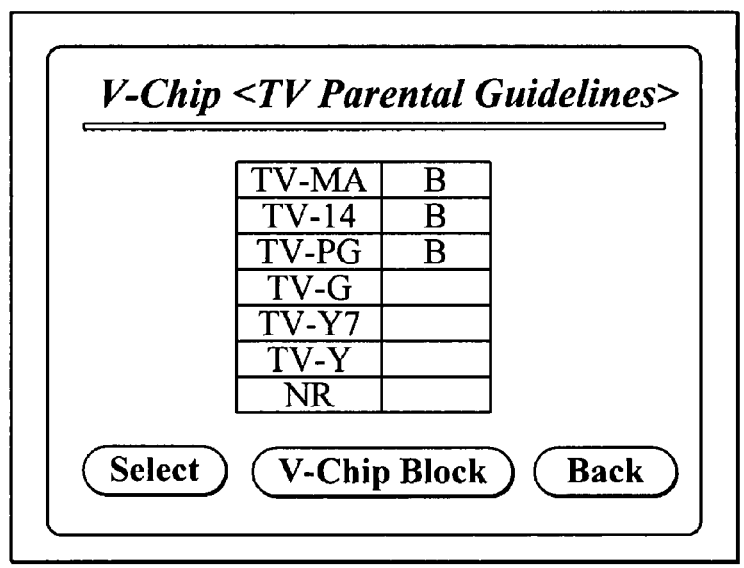
FIG. 7B is a view showing an example of a setting screen to set a broadcast content blocking level for the conventional broadcast receiving apparatus in accordance with a plurality of broadcast content blocking standards, in a case where the setting screen of the broadcast content blocking level is set with respect to TV Parental Guidelines.
Figure 7C:
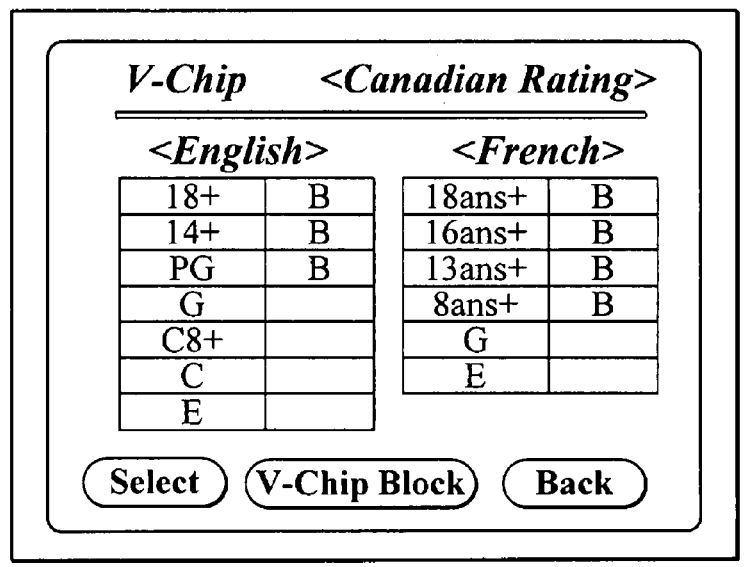
FIG. 7C is a view showing an example of a setting screen to set a broadcast content blocking level for the conventional broadcast receiving apparatus in accordance with a plurality of broadcast content blocking standards, in a case where the setting screen of the broadcast content blocking level is set with respect to Canadian English Language Rating and with respect to Canadian French Language Rating.

Next, broadcast content blocking processing of the CPU 131 in accordance with the execution of the broadcast content blocking program 134c is described with reference to the flowchart of FIG. 6.

When the CPU 131 receives the broadcast content data in step S1, the CPU 131 extracts the rating data from the received broadcast content data in step S2. Subsequently, the CPU 131 refers the first setting table 133a, reads out the first rating level which is set in connection with the rating data that is extracted from the broadcast content data, and temporally stores the rating data which is read out in the RAM 132 (step S3). Next, the CPU 131 reads out the audience level which is stored in the rating level setting data 133c of the EEPROM 133 (step S4), obtains current time data from the broadcast content data or the timing unit not shown, and determines whether the time zone is daytime or nighttime, in accordance with the current time data (step S5). Subsequently, the CPU 131 refers the second setting table 133b, reads out the second rating level set in accordance with the audience level which is stored in the rating level setting data 133c for the current time zone, and temporally stores the second rating level which is read out, in the RAM 132 (step S6). Then, the CPU 131 compares the first rating level set in connection with the rating data which is extracted from the broadcast content data and the second rating level selected by the user, and determines whether the first rating level set in connection with the rating data which is extracted from the broadcast content data is lower than the rating data selected by the user or not (step S7). In a case where the CPU 131 determines in step S7 that the first rating level set in connection with the rating data which is extracted from the broadcast content data is lower than the second rating level selected by the user (step S7; Yes), the CPU 131 mutes the broadcast content data (step S8) by outputting the control signal to the mute circuit 10 to conduct the predetermined mute processing, and displays OSD which informs the user that the broadcast content is blocked by adding the predetermined OSD data by the OSD circuit 9. In a case where the CPU 131 determines in step S7 that the first rating level set in connection with the rating data which is extracted from the broadcast content data is equal to or higher than the second rating level selected by the user (step S7; No), the mute processing is not conducted, and video/audio according to the broadcast content data is outputted (step S9).

As described above, according to the television receiving apparatus 100 of the present invention, the first setting table 133a which stores rating data of the plurality of broadcast content blocking standards, each piece of the rating data being corresponding with one of first rating levels, and the second setting table 133b which stores plurality of audience levels, each of the plurality of audience levels being corresponding with one of the second rating levels, are stored by the EEPROM 133. A second rating level is selected by execution of the selecting program 134b by the CPU 131, in which the selecting screen to select the audience level is displayed in the display unit 11 and one audience level is selected at the selecting screen which is displayed in the display unit 11 by key operation of the key input unit 1. Further, one broadcast content is blocked in accordance with the second rating level which is set at the second setting table 133b in connection with the audience level selected by execution of the selecting program 134b and in accordance with the first rating level which is set at the first setting table 133a in connection with the rating data extracted from broadcast content data of the one broadcast content. By executing the setting program 134a with the CPU 131, each of the audience level and one of the second rating levels is set in connection with each other by the predetermined time zone, and are registered in the second setting table 133b. Therefore, broadcast content blocking level for the plurality of broadcast content blocking standards can be set by one operation by selecting the audience level, instead of setting them individually. Thus, burden of the user in relation with setting the broadcast content blocking level for the plurality of broadcast content blocking standards can be lessened.

Further, since the second rating level can be set by the time zone by executing the setting program 134a with the CPU 131, a broadcast content that is blocked by time zone can be variably set and thus a broadcast receiving apparatus that has excellent usability for the user can be provided.

By executing the broadcast content blocking program 134c with the CPU 131, the level meter to select the audience level is displayed in the display unit 11 and the audience level is selected by moving the level location of the level meter through operation of the key input unit 1. Therefore, setting operation can be done easily and operability can be improved.

Here, the present invention is not limited to the aforementioned embodiments. Various kinds of modification and alteration of design can be conducted so long as it does not deviate the scope of the present invention.

For example, in the present embodiment, the broadcast receiving apparatus that receives a digital broadcast was described. However, it may also be a broadcast receiving apparatus that receives an analog broadcast. That is, it may have a structure in which the rating data is not transmitted by being superimposed on the digital broadcast signal, but is transmitted by being superimposed on a Vertical Blanking Interval (VBI) of an analog composite signal.

Further for example, it may also have a structure which is provided with not only the setting section to set the details of the second setting table 133b, but also a setting section to set the details of the first setting table 133a.

The way of blocking a broadcast content by the broadcast content blocking section is not limited to the way in which mutes video/audio by the mute circuit 10, but also may be a way in which broadcast station which broadcasts the broadcast content cannot be selected, or the like.

The table of table stored in the storing section is not limited to the first setting table 133a and the second setting table 133b, that were exemplified in the afore-mentioned embodiment.

The rating data of the TV Parental Guidelines may be rated not only by the age, but may also be rated by detail of the broadcast content in addition.

According to the first aspect of the present embodiment, there is provided a broadcast receiving apparatus which blocks a broadcast content in accordance with a plurality of broadcast content blocking standards, comprising:

a storing section provided with a first setting table and a second setting table, the first setting table storing rating data of the plurality of broadcast content blocking standards, each piece of the rating data being corresponding with one of first rating levels, and the second setting table storing a plurality of audience levels, each of the plurality of audience levels being corresponding with one of second rating levels;

a selecting section to select one of the second rating levels, the selecting section being provided with a display control section to make a display section display a selecting screen and an input section to select one of the audience levels in the selecting screen displayed in the display section;

a broadcast content blocking section to block one broadcast content, in accordance with one of the second rating levels which is set at the second setting table according to the one of the audience levels selected by the input section and in accordance with one of the first rating levels which is set at the first setting table according to rating data extracted from data of the one broadcast content; and a setting section to set the plurality of audience levels, each of the audience levels being corresponding with one of the second rating levels in accordance with time zones and to register the plurality of audience levels and the second rating levels in the second setting table, wherein the display control section makes the display section display a level meter to select one of the audience levels, and the input section selects the one of the audience levels by changing a selected level of the level meter.

According to the first aspect of the present embodiment, broadcast content blocking level for the plurality of broadcast content blocking standards can be set by one operation by selecting the audience level, instead of setting them individually. Thus, burden of the user in relation with setting the broadcast content blocking level for the plurality of broadcast content blocking standards can be lessened.

Further, since the setting section can set the second rating level by the time zone, a broadcast content that conducts blocking by time zone can be variably set and thus a broadcast receiving apparatus that has excellent usability for the user can be provided.

Since the display control section displays the level meter to select the audience level in the display section and the input section selects the audience level by moving the level location of the level meter, setting operation can be done easily and operability can be improved.

According to the second aspect of the present embodiment, there is provided a broadcast receiving apparatus which blocks a broadcast content in accordance with a plurality of broadcast content blocking standards, comprising:

a storing section to store rating data of the plurality of broadcast content blocking standards, each piece of the rating data being corresponding with one of first rating levels;

a selecting section to select one of second rating levels; and a broadcast content blocking section to block one broadcast content in accordance with one of the second rating levels selected by the selecting section and in accordance with one of the first rating levels which is set at the storing section according to rating data extracted from data of the one broadcast content.

According to the second aspect of the present embodiment, the broadcast content blocking level for the plurality of broadcast content blocking standards can be set by one operation by selecting the second rating level, instead of setting them individually. Thus, burden of the user in relation with setting the broadcast content blocking level for the plurality of broadcast content blocking standards can be lessened.

Preferably, the broadcast receiving apparatus further comprises a setting section to set the plurality of audience levels, each of the plurality of audience levels being corresponding with one of the second rating levels and to register the plurality of audience levels and the second rating levels in a second setting table; wherein the storing section includes a first setting table to store the rating data of the plurality of broadcast content blocking standards, each piece of the rating data being corresponding with one of the first rating levels, and the second setting table to store the plurality of audience levels, each of the plurality of audience levels being corresponding with one of the second rating levels.

Therefore, a broadcast receiving apparatus that has excellent usability with respect to each of the individual user can be provided.

Preferably, the setting section is capable of setting the second rating levels in accordance with predetermined time zones.

Therefore, burden of the user in relation with changing the setting can be lessened.

Preferably, the selecting section comprises:

a display control section to make a display section display a selecting screen, and an input section to select one of the audience levels in the selecting screen displayed in the display section.

Therefore, setting operation can be done easily and operability can be improved.

The entire disclosure of Japanese Patent Application No. 2006-175274 filed on Jun. 26, 2006 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A broadcast receiving apparatus which blocks a broadcast content in accordance with a plurality of broadcast content blocking standards, comprising:

a storing section provided with a first setting table and a second setting table, the first setting table storing rating data of the plurality of broadcast content blocking standards, each piece of the rating data being assigned to one of first rating levels, and the second setting table storing a plurality of audience levels, each of the plurality of audience levels being assigned to one of second rating levels;

a selecting section to select one of the second rating levels, the selecting section being provided with a display control section to make a display section display a selecting screen and an input section to receive input of one of the audience levels in the selecting screen displayed in the display section;

a broadcast content blocking section to block one broadcast content by comparing the first rating level corresponding to rating data extracted from data of the one broadcast content according to the first setting table with the second rating level corresponding to the audience level selected by the selecting section according to the second setting table; and a setting section to set the plurality of audience levels, each of the audience levels being assigned to one of the second rating levels in accordance with time zones, and to register the plurality of audience levels and the second rating levels in the second setting table, wherein the display control section makes the display section display a level meter to select one of the audience levels, and the input section selects the one of the audience levels by changing a selected level of the level meter.

2. A broadcast receiving apparatus which blocks a broadcast content in accordance with a plurality of broadcast content blocking standards, comprising:

a storing section provided with a first setting table and a second setting table, the first setting table storing rating data of the plurality of broadcast content blocking standards, each piece of the rating data being assigned to one of first rating levels, and the second setting table storing a plurality of audience levels, each of the plurality of audience levels being assigned to one of second rating levels;

a selecting section to select one of the second rating levels, the selecting section being provided with an input section to receive input of one of the audience levels;

a broadcast content blocking section to block one broadcast content by comparing the first rating level corresponding to rating data extracted from data of the one broadcast content according to the first setting table with the second rating level corresponding to the audience level selected by the selecting section according to the second setting table; and a setting section to set the plurality of audience levels, each of the audience levels being assigned to one of the second rating levels, and to register the plurality of audience levels and the second rating levels in the second setting table.

3. The broadcast receiving apparatus as claimed in claim 2, wherein the setting section is capable of setting the second rating levels in accordance with predetermined time zones.

4. The broadcast receiving apparatus as claimed in claim 2, wherein the selecting section comprises:
   a display control section to make a display section display a selecting screen, and
   wherein the input section receives input to select one of the audience levels in the selecting screen displayed in the display section.

5. The broadcast receiving apparatus as claimed in claim 1, wherein:
   the first rating level is numeric value data that represents each piece of the rating data of the plurality of broadcast content blocking standards; and
   the second rating level is numeric value data that represents each of the plurality of audience levels.

6. The broadcast receiving apparatus as claimed in claim 2, wherein:
   the first rating level is numeric value data that represents each piece of the rating data of the plurality of broadcast content blocking standards; and
   the second rating level is numeric value data that represents each of the plurality of audience levels.

7. A method for blocking a broadcast content in accordance with a plurality of broadcast content blocking standards, the method comprising:
   receiving broadcast content data of the broadcast content;
   extracting a piece of rating data of a broadcast content blocking standard from the received broadcast content data;
   referring to a first setting table to read a first rating level set in connection with the extracted piece of rating data, the first setting table storing a plurality of pieces of rating data of each of the broadcast content blocking standards, each piece of rating data being assigned to one of first rating levels;
   reading an audience level selected by a user;
   referring to a second setting table to read a second rating level set in connection with the read audience level, the second setting table storing a plurality of audience levels, each audience level being assigned to one of second rating levels;
   comparing the read first rating level with the read second rating level; and
   muting the received broadcast content data to block the broadcast content when the read first rating level is lower than the read second rating level.

* * * * *